Patented Sept. 5, 1933

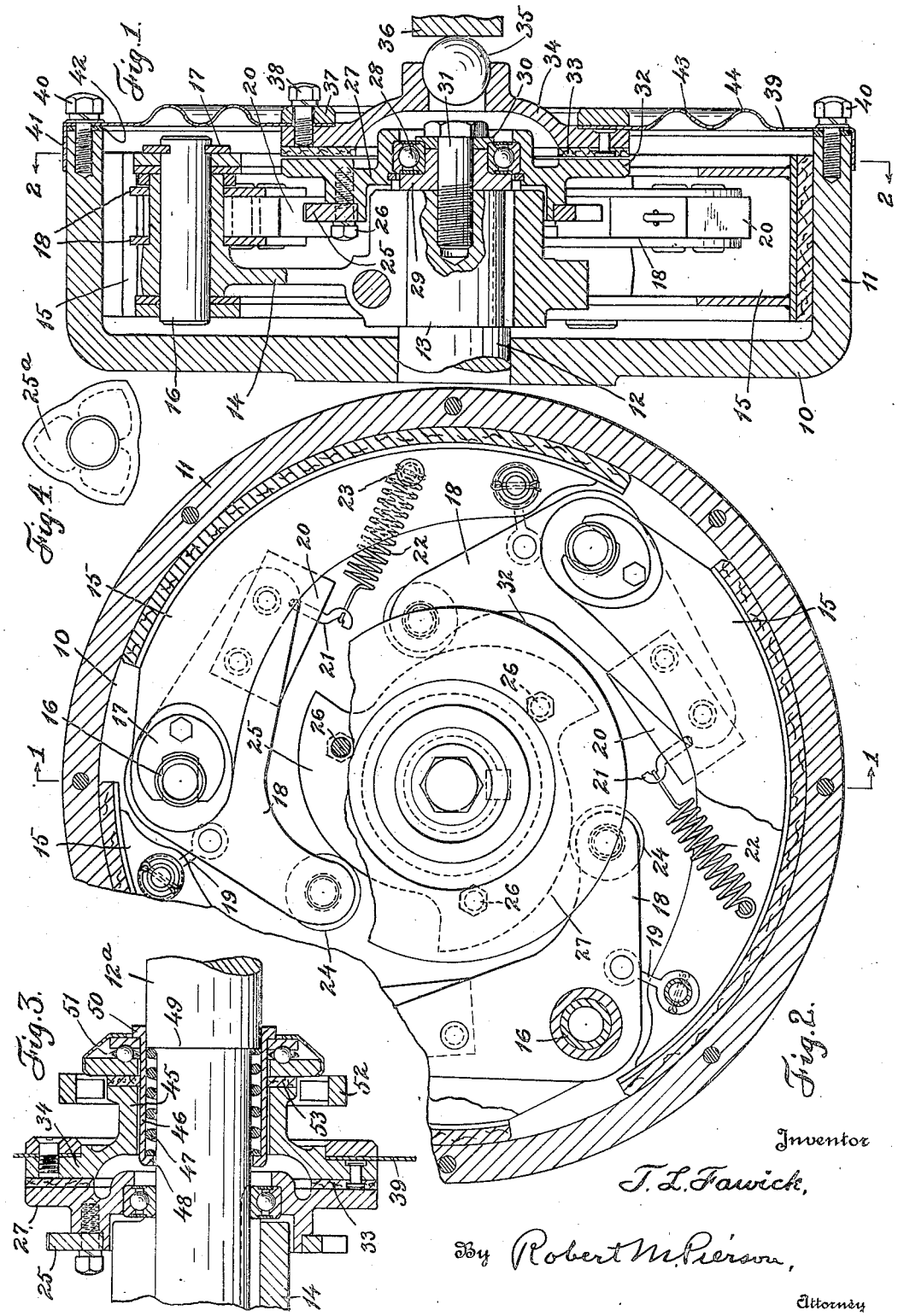

1,925,897

UNITED STATES PATENT OFFICE 1,925,897

SERVO CLUTCH

Thomas L. Fawick, Akron, Ohio, assignor to Fawick Manufacturing Company, Waukesha, Wis., a corporation of Wisconsin Application November 23, 1931
Serial No. 576,724

11 Claims. (Cl. 192—35)

This invention relates to friction clutches and similar apparatus such as brakes, but especially to the former.

My principal object is to provide for greater ease of control and operation of such apparatus, this being particularly important in the larger or heavy-duty clutches which in most cases heretofore have required the exertion of considerable physical force to effect their engagement or to release the clutch-engaging spring, although my invention also applies to smaller clutches such as used on automobiles. To that end I provide a novel servo mechanism including a pilot or secondary friction clutch for utilizing the power of the rotary driving member to produce the engagement of the clutch, in combination with a centrifugally balanced main clutch which permits easy operation of the pilot clutch, especially during release.

A further object is to provide an improved form of enclosed clutch whose interior working parts are protected from the entrance of dust etc. for use on road rollers and in other situations where such qualities are desired.

A still further object is to provide improved means for clutch control through a fluid-pressure medium such as the vacuum furnished by the suction of an internal-combustion engine.

Of the accompanying drawings, Fig. 1 is an axial section through a mechanically-controlled servo clutch illustrating one form of my invention, the section being taken on the line 1—1 of Fig. 2.

Fig. 2 is a transverse section, partly broken away, taken on the line 2—2 of Fig. 1.

Fig. 3 is an axial section showing a modification in which the clutch-engaging movement of the control member is effected by means of a spring and its releasing movement by a pedal lever or the like.

Fig. 4 is an end elevation showing a modified shape of servo cam.

Figure 5:
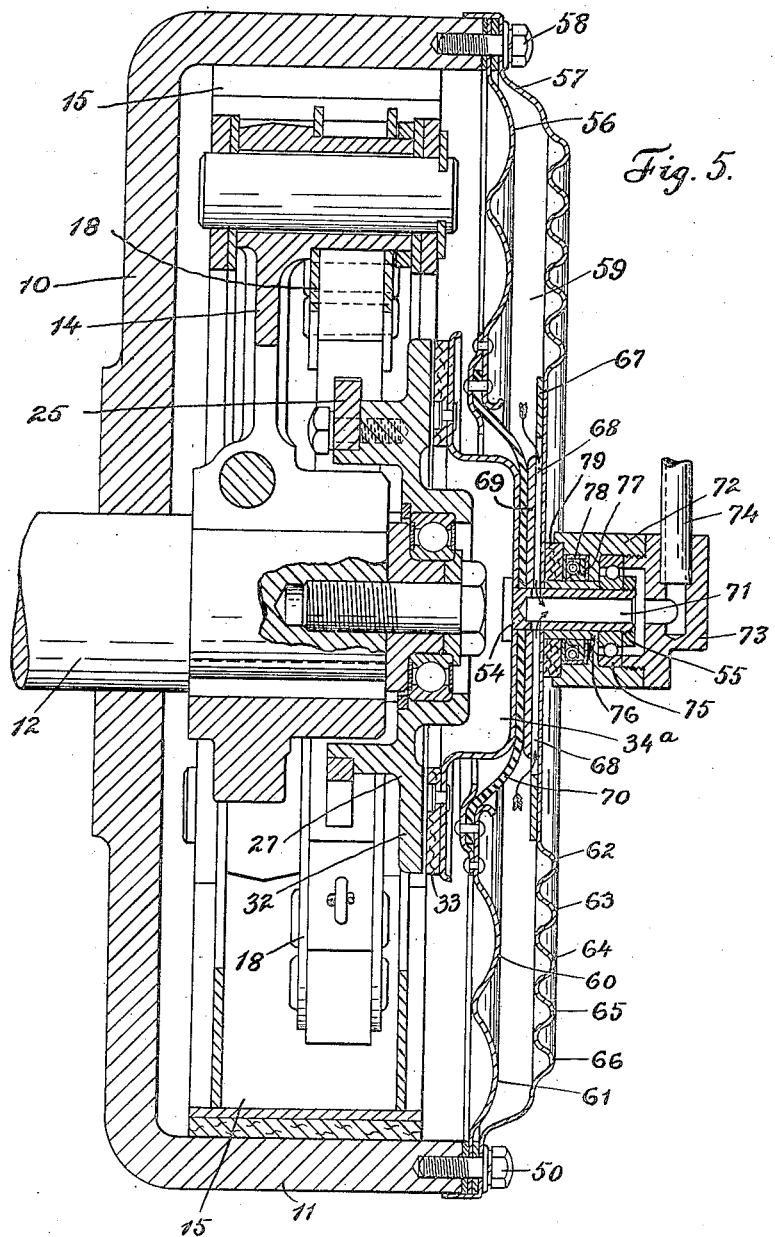
Fig. 5 is an axial section illustrating a modification adapted for the use of engine vacuum as a controlling medium.

Referring at first to Figs. 1 and 2, 10 is a cup-shaped rotary wheel, drum, pulley or the like, such as the flywheel of an engine or a wheel driven by the engine, said wheel having a rim or flange 11 whose cylindrical inner surface forms the driving surface of the clutch. 12 is a driven shaft centrally journaled in the web of the wheel 10 and having a reduced inner-end portion 13 within said wheel.

14 is a spider having a longitudinally-split hub keyed and clamped on the reduced end portion 13 of the driven shaft and having three arms which pivotally support an equal number of outwardly-acting shoes 15 each provided with a suitable friction facing attached to a shoe body having side plates which straddle the respective spider arms.

The shoes 15, together with their counterbalanced operating levers and the mode of mounting and coordinating said shoes and levers, which will briefly be described, are preferably of the general character disclosed in my Patent No. 1,847,389, dated March 1, 1932, but the present invention is not confined to that type of clutch and any suitable equivalent for these shoes and operating levers might be employed.

Pivot pins 16 for one end of each of the shoes 15 are mounted to turn in bearings at the ends of the spider arms and detachably held in non-turning relation to the shoes by means of forked retaining plates 17 which also hold the pins against axial displacement in their bearings.

For each of the shoes 15 there is provided an operating lever 18 connected with said shoe by means of a link 19 and mounted to turn coaxially with the pivot pin 16 of the next adjacent shoe on a fixed journal formed by the outer side of the spider-arm bearing for said shoe, these operating levers being located between the side plates of the shoes 15 at the rear or right-hand side of the spider arms as viewed in Fig. 1. Each of the levers 18 is provided with a counterbalancing weight 20 attached to its arm opposite to the arm connected with the link 19 for counteracting the effect of centrifugal force on the linked end of the shoe 15, and each weight 20 in this case has a hook 21 connected by a spring 22 with a pin 23 on the adjacent shoe for releasing said shoe. The linked arm of each shoe is extended to carry a cam roller 24.

The front and rear sides of the shoes 15 and their levers 18 are made symmetrical and said shoes and levers may be reversed on their pins 16 when it is desired to assemble the clutch for operation in an opposite direction of rotation. The direction of rotation, as viewed in Fig. 2, is preferably counter-clockwise in order that the driving wheel 10 may have a servo action on the shoes tending to increase their frictional pressure against the rim of said wheel when once engaged therewith.

For actuating the friction shoes 15 to produce clutch engagement through their operating levers 18, I provide a cam 25 having a limited rotation about the driven shaft 12 in the plane of the clutch, said cam having three lobes as shown, with curved operating edges acting semi-radially on the lever rollers 24, each lobe in this instance being non-symmetrical or having an abrupt end face which allows the acting edge of said lobe to have a gradual rise of maximum angular extent.

The cam 25 is detachably connected by screws 26 to the forward side of a cam-supporting plate 27 in order that said cam may be reversed conformably with the shoes and levers for an opposite direction of clutch rotation. Plate 27 is carried by a ball bearing 28, preferably closed at both ends to make it dust proof, on the rear end of the driven shaft 12, through the medium of a pair of shouldered plates 29, 30 secured to the shaft by a central screw 31 and holding the inner ball race of the bearing 28 between them.

The cam-supporting plate 27 is a servo member formed with a radial friction flange 32 adapted to be engaged by a complemental friction facing ring 33 which is riveted to the radial flange of an axially-movable controlling and servo actuating member 34, centrally provided with a hardened ball 35 which is fixed in its hub portion, and adapted to be moved and held in a forward position for producing clutch engagement by a suitable abutment 36, under the control of an operator.

The controlling member 34 is attached by a ring 37 and screws 38, of which one is shown in Fig. 1, to the inner margin of a thin, annular, flexible metal plate 39 whose outer margin is secured by screws 40 to the rim 11 of the driving wheel 10, said outer margin being horizontally flanged over at 41 upon said wheel rim and packed by a soft gasket 42 to make the joint dust proof. The intermediate portion of plate 39 is formed with concentric corrugations 43, 44 to increase its flexibility. Thus it will be seen that the working parts of the clutch are completely enclosed and protected against dust, moisture, etc. within the interior space of the hollow wheel 10, which is closed on its forward side by the web of said wheel and on its rear side by the flexible plate 39, the servo cam actuating and controlling member 34 and its central contact ball 35. The controlling abutment 36 therefore acts mechanically, by a substantially sealed connection, formed in this instance in part by the flexible end wall including plate 39 of the driving drum, through said end wall, upon the internal adjustable friction member 33 of the servo secondary or pilot clutch, to engage said secondary clutch and thereby actuate the cam 25; but it will be understood that other modes of mechanically communicating the motion of an external controlling member through a sealed end wall to the internal secondary clutch could be adopted without departing from my invention.

In the operation of this form of my invention, the driving wheel 10 being in rotation and the friction shoes 15 retracted, the engagement of the main clutch formed by the driving rim 11, the shoes 15 and their immediate supporting and operating devices, is brought about by the operator applying axial force to the abutment 36 contacting with the hardened ball 35. This moves the controlling member 34 which, together with the facing 33 and the driven member 32, constitutes the secondary clutch, until its friction facing engages the complemental friction face on member 32 of the cam plate 27, thereby rotating the cam 25 about the driven shaft 12, causing the lever rollers 24 to ride up on the lobes of said cam, thus turning the levers 18 against the force of springs 22 and through the links 19, forcing the friction shoes 15 radially outward into clutching engagement with the rim of the wheel 10. At the conclusion of this engaging movement the cam is brought to the same speed of rotation as the driving wheel and there is thereafter no relative movement or friction between the two as long as the clutch shoes remain tightly engaged. Should increasing torque resistance cause the shoes to slip slightly on the driving wheel, the resulting relative movement of cam 25 on the driving shaft will cause the lever rollers 24 to ride further up on the cam lobes and thus automatically tighten the clutch engagement while the secondary clutch remains tight because of its mechanical advantage over the main clutch obtained through the power-multiplying cam and levers. Whatever may be the form of the main clutch, it is important that its friction element or elements, exemplified in this instance by the shoes 15, shall be substantially balanced against the action of centrifugal force, as is here done by the counterweighted levers 18 and might be otherwise accomplished in other clutch structures, in order to obtain easy clutch release under all conditions by the avoidance of binding or uneven action upon the cam or equivalent member controlled by the secondary clutch, as well as easy clutching action of said secondary clutch under all conditions. Upon retraction of the abutment 36 to release the secondary and main clutches, the cam 25 is reversed through reaction upon its lobes by the lever rollers 24, produced by the pull of the springs 22.

This clutch requires no adjustment for wear, since it automatically furnishes its own adjustment until the friction facings are worn out. The engagement is effected with a very small exertion of physical force by the operator, because the engaging force is furnished mostly by the driving wheel through the described servo action. The release may also be easily effected by removing the pressure of the abutment 36, whereupon the frictional engagement between the members 34 and 27 is relieved and the cam 25 is turned back and the shoes 15 released by the force of the springs 22. Should there be a suddenly-applied negative torque imposed through the driving end, as by suddenly closing the engine throttle and thereby causing the driven mechanism (such as a vehicle) to drive the engine, the main clutch will automatically release and produce a "free-wheeling" action by the forward slip of the fly-wheel 10 upon the clutch shoes 15, the pressure of the springs 22 thereupon causing the rollers 24 to ride down the cam lobes 25, whereas, if the throttle is gradually closed, this will not occur, but the main clutch will remain tight so that the engine acts as a brake.

Fig. 3 illustrates a modification adapted for a clutch of the automobile type in which the driving wheel or engine flywheel, the clutch shoes, their operating levers and the shoe support or spider 14, the shoe actuating cam 25, its rotary servo supporting plate 27, the coacting servo cam-actuating and controlling member 34 and the flexible wall plate 39 are or may be the same as in the embodiment previously described except for the hub shape of said controlling member 34. In this case member 34 is provided with a tubular hub portion 45 surrounding a sleeve 46 which is slidable axially on the driven shaft $12^a$, and a spring 47 contained within said sleeve is interposed between the forward end flange 48 of the sleeve and a shoulder 49 on the shaft. Rearwardly abutting against the rear end flange 50 of said sleeve is a ball thrust bearing 51 adapted to be engaged by the inwardly-projecting studs of a clutch-releasing lever 52, such as a pedal lever. Between the forward bearing race and the rear face of the controlling member hub 45 is interposed a soft washer 53 for dust exclusion. It will be evident that in this form of the invention the clutch parts are normally held in engagement by the action of the spring 47 in holding the friction face of the controlling member 34 against that of the servo cam plate 27, and release is effected through the action of the pedal lever 52 in withdrawing the sleeve 46 against the pressure of said spring.

In Fig. 4 is shown a modified cam which does not require reversal when the clutch is assembled for an opposite direction of rotation, since the lobes are of symmetrical shape on both sides of their central axes. The range of angular movement, however, in this case is less than for the shape shown in Fig. 2.

In Fig. 5 I have represented a further embodiment which includes a rotary device carried by the driving wheel and operated by a fluid-pressure medium, such as atmospheric pressure opposed to a vacuum which may be furnished by the suction of an internal-combustion engine, for effecting the operation of the servo actuating and controlling member from a remote point by means of a suitable valve.

The construction and mode of operation of the clutch mechanism are the same as in Figs. 1 and 2 and the parts are designated by the same reference numerals, as far as the friction facing of the controlling member, here designated as 34ª. Said member is attached by a hollow stem or bolt 54 and nut 55 to the axially-movable center of the vacuum-operated device, which includes inner and outer metal plates 56, 57 connected at their outer margins with the rim 11 of the driving wheel 10 by means of screws 58 and suitable joint packings and separated by a space 59 constituting a vacuum chamber. The inner plate 56 is substantially rigid and is formed with broad concentric corrugations 60, 61 to increase its stiffness. The outer plate 57 is flexible and provided with a larger number of narrow concentric corrugations 62, 63, 64, 65, 66, to increase its flexibility. A central flat, metal reinforcing plate or disk 67, formed with radial slots 68 to provide air passages, lies against the inner face of the flat central portion of the outer plate 57, and a second flat metal plate or disk 69, of smaller diameter, lies against said plate 67 to cover the inner portions of said air passages and provide a spacer.

Between the plate 69 and the rear flat portion of the pressed metal body of the controlling member 34ª is clamped the inner margin of a flexible diaphragm 70 made of a suitable non-metallic material, such as rubber reinforced with fabric. This diaphragm has its outer margin fastened to the inner margin of the rigid inner plate 56 and thus serves to complete the inner wall of the vacuum chamber 59 and permit the axial movements of the outer plate 57 and the controlling member 34ª. In this latter as in the previously described embodiment of my invention, the working parts of the clutch are thoroughly protected against the entrance of dust and moisture.

The inner ends of the air passages 68 communicate through ports in the wall of the stem-bolt 54 with the central aperture 71 of said bolt, and a non-rotary chambered block or fitting 72 having a screwed end cap 73 surrounds the body of the bolt 54. A flexible pipe 74 provided with a suitable control valve (not shown) is attached to the cap 73 and connects with the interior of said cap and thence through the passages 71 and 68 with the chamber 59 for transmitting the engine vacuum to said chamber or shutting it off and restoring atmospheric pressure therein. A ball bearing 75 is provided between the fitting 72 and the outer end portion of the bolt 54 to permit free rotation of the latter within said fitting, a spacer sleeve 76 is interposed between the inner ball race of said bearing and the rear face of the plate 57, and the running or swivel joint is packed or sealed by means of a lip packing 77 embraced by a constricting spring 78. A soft, felt dust washer 79 is also interposed as a packing retainer between the fitting 72 and the plate 57. When the center of plate 57 is moved axially inward in response to a vacuum in the chamber 59, it carries with it, as a unit, the rotary parts 34ª, 54, 55, 67, 69 and 76, as well as the swiveled, non-rotary parts 72, 73.

In the operation of this embodiment it will be evident that the axial inward movement of the servo actuating and controlling member 34ª, to bring its friction facing into contact with the complemental friction surface on the flange 32 of the cam-supporting plate 27 and thereby to rotate the servo cam 25 about the driven shaft 12 until said cam is brought up to the same speed as the controlling member, whereby the clutch shoes 15 through their operating levers 18 are outwardly set against the rim of the driving wheel, is readily accomplished from a remote point by opening the valve in pipe 74, thus creating a vacuum in chamber 59 which permits the external atmospheric pressure to produce said axial movement of the flexible plate and controlling member.

Since a brake is a special form of friction clutch in which the shoes or equivalent friction members are held against revolving and the rotary brake drum corresponds to the driving member, it will be obvious that features of any of the described embodiments may be applied to a brake with such modifications of structure as may be required to adapt the invention to that use except that the described centrifugal balancing expedients are peculiarly applicable to a clutch.

It will also be understood that the form of embodiment may be further varied within the scope of the claims and the invention is not intended to be restricted except as required by the claims and the prior state of the art.

I claim:

1. In a friction clutch, the combination of a driving wheel having an overhanging rim, driven parts located within said rim and including a driven shaft portion, an outwardly-engaging, centrifugally-balanced, friction shoe carried thereby, and a shoe-actuating servo cam rotatable about said shaft portion without being affected by centrifugal force, and having a friction member, a coacting friction member on the driving wheel, axially movable into engagement with the cam friction member, and means for controlling said axially movable friction member.

2. In a friction clutch, the combination of a driving wheel, a driven shaft having a shoe support, a series of friction shoes pivoted on said support for outward engagement with the driving wheel, power multiplying levers pivoted to said support and balancing the shoes against centrifugal force, a cam rotatably supported by said shaft and having a series of radially-acting lobes for actuating the respective shoes, and frictional servo means controllable by an operator and rotatable with the driving wheel for rotating said cam on the shaft in a shoe-actuating direction.

3. In a friction clutch, the combination of rotary driving and driven members, a plurality of friction elements, each pivoted at one end for connecting the two, said elements each being symmetrically formed on its front and rear sides and reversibly mountable for clutching in either direction of rotation, and a cam rotatable with respect to said friction element and adapted for actuation of the latter in either direction of rotation of the cam.

4. In a friction clutch, the combination of a driving wheel, a driven shaft having a shoe support, a friction shoe reversibly pivoted on said support for outward engagement with the driving wheel and adapted, when reversed, for clutching in the opposite direction of rotation, a cam support rotatable about said shaft, a shoe-actuating cam detachably mounted on said cam support and reversible thereon for the opposite direction of rotation, and servo means frictionally actuated by said driving wheel for rotating said cam support about the shaft.

5. In a friction clutch, the combination of a driving wheel having an end wall provided with a clutch-controlling element, and with a flexible portion permitting axial movement of said element, a secondary friction member rotatable by said element, and primary frictional driven mechanism contained in said wheel and subject to said controlling element through the latter's action on said member.

6. A friction clutch comprising a hollow driving wheel having a flexible wall member and an axially movable frictional controlling and servo actuating member carried thereby, a primary driven clutch element contained within said driving wheel for frictional engagement with the latter, and secondary means also contained within said driving wheel and operatively movable by contact with said controlling member for actuating said driven clutch element.

7. In a friction clutch, the combination of a hollow driving wheel having an axially movable servo actuating and controlling member and a flexible, corrugated, metal wall plate carrying said member and forming an end wall of the driving wheel, a driven shaft having a shoe within said driving wheel for frictional engagement with the latter, and a servo cam rotatable on said shaft by frictional engagement with said controlling member for actuating said shoe.

8. In a friction cluch or similar apparatus, the combination of a rotary member carrying spaced inner and outer wall plates enclosing a vacuum chamber between them, the outer one of said plates being flexible and inwardly movable by atmospheric pressure, and a clutch member actuated by inward movement of said flexible plate for frictional engagement with said rotary member.

9. An apparatus according to claim 8, in which the inner one of said spaced plates is flexibly connected with the outer one.

10. In a friction clutch or similar apparatus, the combination of a rotary, hollow drum having spaced inner and outer end-wall plates of which the former is relatively rigid and the latter is corrugated to make it flexible, said plates enclosing a vacuum chamber betwen them, a flexible wall connection between the inner margins of said plates, an axially movable servo actuating and controlling member centrally carried by said flexible plate, a non-rotary vacuum fitting having a packed bearing on said controlling member, a shoe within said drum for frictional engagement with the latter, and a shoe actuating, rotary servo cam frictionally operated by said controlling member.

11. Clutch mechanism comprising a main friction clutch including a friction element substantially balanced against centrifugal force, means for biasing said element to a released position, a secondary friction clutch substantially unaffected by centrifugal force for operating the main clutch through power derived from the latter, and a power-multiplying, motion-transmitting connection between said friction element and the secondary clutch, adapted to increase the clutching action by slippage of said friction element due to an increased driven resistance and further adapted, by pressure of said biasing means exerted upon said connection when there is a suddenly-applied negative torque of the driving means, to automatically release the main clutch.

THOMAS L. FAWICK.